3,285,961
PROCESS FOR STABILIZING TOLUENE DIAMINE
Philip D. Hammond, North Haven, and Ehrenfried H. Kober, Hamden, Conn., assignors to Olin Mathieson Chemical Corporation, a corporation of Virginia
No Drawing. Filed May 9, 1963, Ser. No. 279,333
5 Claims. (Cl. 260—578)

This invention relates to a process for the stabilization of toluene diamine against degradation.

Toluene diamine, which is sometimes referred to as diaminotoluene, has been used extensively as a reactant in the preparation of toluene diisocyanate, which is finding increasing use in the preparation of polyurethane foams.

Substantially pure 2,4-diaminotoluene can be distilled under high vacuum to yield a light yellow colored product which solidifies to a white solid. This solid is very stable to color changes when stored in the ordinary way in an air atmosphere.

Technical grade or crude toluene diamine, which is a mixture of 2,4-, 2,6-, 2,5-, 3,4- and 2,3-isomers and small amounts of amino cresols, can be distilled under high vacuum to yield a pale yellow product which immediately turns purple to black upon the slightest contact with air. This is probably due to the presence of ortho diamines which are rapidly degraded by air oxidation. Such oxidation causes extensive degeneration of the 2,6- and 2,4-diaminotoluene as evidenced by the pronounced evolution of ammonia gas on storage at elevated temperatures of 100° C.

Technical grade toluene diamine is generally prepared by the hydrogenation of dinitrotoluene in the presence of a catalyst. The product is generally stored in a molten state until ready for use in the preparation of toluene diisocyanate. When the process for the preparation of toluene diamine and the process for the preparation of toluene diisocyanate are both located at the same plant site, extended storage periods for the toluene diamine intermediate generally are not necessary, and as a result, the molten toluene diamine can be stored in an atmosphere of conventional inert gases for short periods of a few days without significant degradation of the toluene diamine. However, when extended storage periods, for example, 30 days or more, are encountered due to shutdown of the toluene diisocyanate process or due to transporting the toluene diamine to a different plant site, or otherwise, conventional inert gaseous stabilizers are not satisfactory.

It is an object of this invention to provide a novel process for stabilizing molten toluene diamine against degradation.

Another object of the invention is to provide an improved process for storing molten toluene diamine.

These and other objects of the invention will be apparent from the following description thereof.

It has now been discovered that crude or technical grade toluene diamine can be stabilized against degradation when it is stored in an atmosphere of hydrogen gas. The stabilizing technique of this invention is particularly suitable for stabilizing molten toluene diamine, but may also be applied to solid toluene diamine.

More in detail, molten toluene diamine is placed in a tank or other suitable closed container having a temperature control means for maintaining the temperature of the molten toluene diamine above its melting point, generally in the range between about 80 and about 120° C., and preferably in the range between about 100 and about 110° C.

Chemical analyses of a typical crude or technical grade toluene diamine which can be stabilized by the technique of this invention is as follows:

| Component: | Percent by weight |
|---|---|
| Toluene diamine— | |
| 2,4-isomer, 2,6-isomer | [1] 94.0 |
| 2,3-isomer, 2,5-isomer, 3,4-isomer | 4.0 |
| Total reducibles (nitro groups) | 0.1 |
| Moisture | 0.1 |
| Tars | Balance |

[1] The weight ratio of the 2,4- to 2,6-isomer is about 80/20.

However, satisfactory stabilization can be obtained when crude toluene diamine containing as low as 92 percent or lower of the 2,4- and 2,6-isomers is employed. In addition, satisfactory stabilization can be obtained when the crude toluene diamine contains 99 percent or more of the 2,4- and 2,6-isomers.

The container for the molten toluene diamine may be constructed of any suitable material of construction which resists corrosion by molten toluene diamine under the temperature conditions of storage, and is preferably constructed of carbon steel or stainless steel.

A gas space between the top of the container and the upper level of molten toluene diamine is maintained in the container during storage, and in accordance with this invention, the gas space is filled with hydrogen. It is preferred to maintain the hydrogen in the gas space at superatmospheric pressure, for example, at pressures in the range between about 15 p.s.i.a. and about 40 p.s.i.a., but any suitable pressure may be employed. If desired, additional stabilizing effect can be obtained by bubbling gaseous hydrogen through a sparger or other gas dispersant in the molten toluene diamine during the storage period and permitting release of the hydrogen from the container at a rate substantially equivalent to the feed rate. Hydrogen released in this manner may be recycled to the sparging system.

When molten toluene diamine is stored under an atmosphere of hydrogen in accordance with the technique of this invention, virtually no change in the concentration of toluene diamine occurs after storage in a molten condition for periods of 100 days or more. However, when the atmosphere above the molten toluene diamine is replaced with nitrogen, carbon monoxide, or air, a significant degradation of molten toluene diamine occurs in less than 30 days.

The following examples are presented without any intention of being limited thereby. All parts and percentages are by weight unless otherwise specified.

Examples I–V

Ten grams of molten technical grade toluene diamine was added to each of 10 glass pressure bottles. To each pressure bottle was also added a previously weighed carbon steel tab, 2 inches x ½ inch x 1/16 inch. Each pressure bottle was then purged with hydrogen for approximately 5 minutes and capped. The pressure bottles were then placed in an oven at 100° C. At intervals of 2, 4, 6, 8, and 16 weeks, a set of 2 pressure bottles was removed from the oven and analyzed for concentration of toluene diamine. The carbon steel tabs were also removed, washed with acetone, dried, cooled and weighed to obtain corrosion data.

The average toluene diamine analysis for each set of samples was as follows:

| Example | Storage Period, Weeks | Toulene Diamine Assay, Percent |
|---------|----------------------|-------------------------------|
| I       | 2                    | 96.8                          |
| II      | 4                    | 96.3                          |
| III     | 6                    | 96.9                          |
| IV      | 8                    | 95.3                          |
| V       | 16                   | 96.6                          |

The original toluene diamine prior to the storage tests contained 96.4 percent toluene diamine. Thus it can be seen that there was substantially no degradation of the toluene diamine for as long as 112 days. In addition, the carbon steel showed no weight loss or weight gain during the period and did not appear to be corroded.

*Example VI*

Employing a procedure similar to that of Examples I–V, molten toluene diamine stored in a glass pressure bottle under hydrogen atmosphere for 30 days analyzed 94.5 percent toluene diamine at the end of this period. For purposes of comparison samples of molten toluene diamine stored under an atmosphere of carbon monoxide analyzed 92.4 percent toluene diamine after 30 days, and a corresponding sample stored under nitrogen for 30 days analyzed 92.2 percent toluene diamine. The original technical grade toluene diamine contained 94.5 percent toluene diamine. These comparisons clearly demonstrate the unique stabilizing property of hydrogen as compared to carbon monoxide and nitrogen.

Various modifications of the invention may be employed, some of which have been referred to above, without departing from the spirit of the invention. For example the novel stabilizing technique of this invention is not only suitable for stabilizing toluene diamine but may also be employed in stabilizing other diamino compounds such as phenylene diamine, diamino diphenyl methane, naphthylene diamine, benzidine, octamethylene diamine, aniline, toluidine, xylidene, xylylene diamine and the like.

What is desired to be secured by Letters Patent is:

1. The process for stabilizing molten crude toluene diamine which comprises maintaining an atmosphere of gaseous hydrogen above said molten toluene diamine at a temperature in the range between about 80 and about 120° C.

2. The process of claim 1 wherein a superatmospheric pressure of hydrogen is maintained above said molten crude toluene diamine.

3. The process for stabilizing molten crude toluene diamine which comprises maintaining an atmosphere of hydrogen above said molten toluene diamine, the pressure of said hydrogen being at a superatmospheric pressure, and the temperature of said molten toluene diamine being in the range between about 80 and about 120° C.

4. The process of claim 3 wherein said superatmospheric pressure is between about 15 and about 40 p.s.i.a.

5. The process for stabilizing molten crude toluene diamine which comprises maintaining a hydrogen atmosphere above molten toluene diamine at a pressure between about 15 and about 40 p.s.i.a., and the temperature of said molten toluene diamine being in the range between about 100 and about 110° C.

References Cited by the Examiner

UNITED STATES PATENTS 3,068,289   12/1962   Woodbridge _____ 260—578

CHARLES B. PARKER, *Primary Examiner.*

D. R. MAHANAND, R. L. RAYMOND,
*Assistant Examiners.*